No. 743,234. PATENTED NOV. 3, 1903.
R. D. BRADLEY.
CANNED GOODS PROCESSING APPARATUS.
APPLICATION FILED APR. 3, 1903.
NO MODEL. 2 SHEETS—SHEET 1.
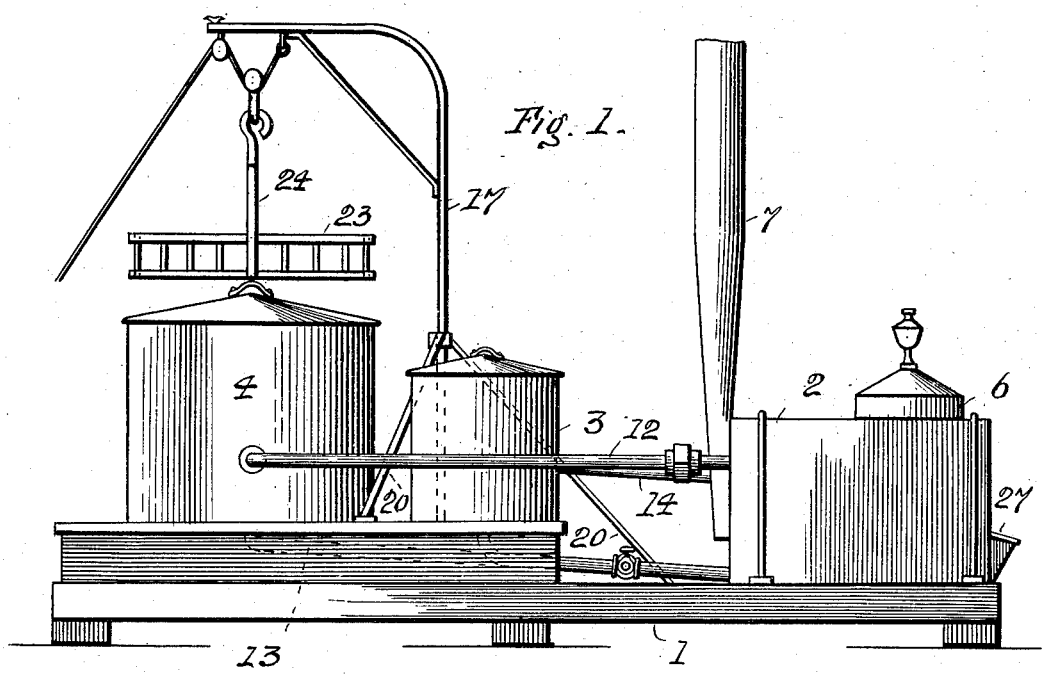
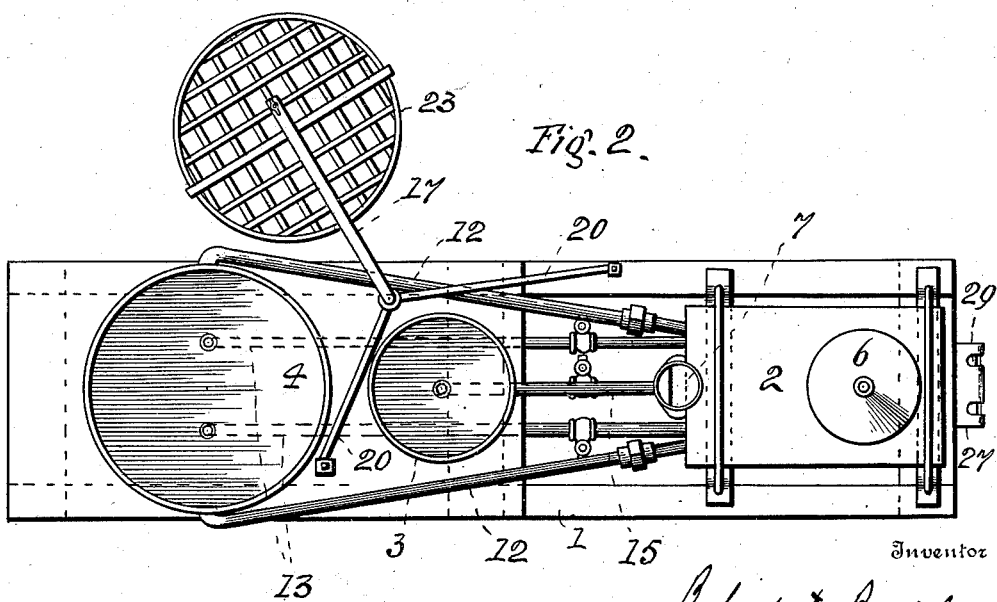

No. 743,234. PATENTED NOV. 3, 1903.
R. D. BRADLEY.
CANNED GOODS PROCESSING APPARATUS.
APPLICATION FILED APR. 3, 1903.
NO MODEL. 2 SHEETS—SHEET 2.
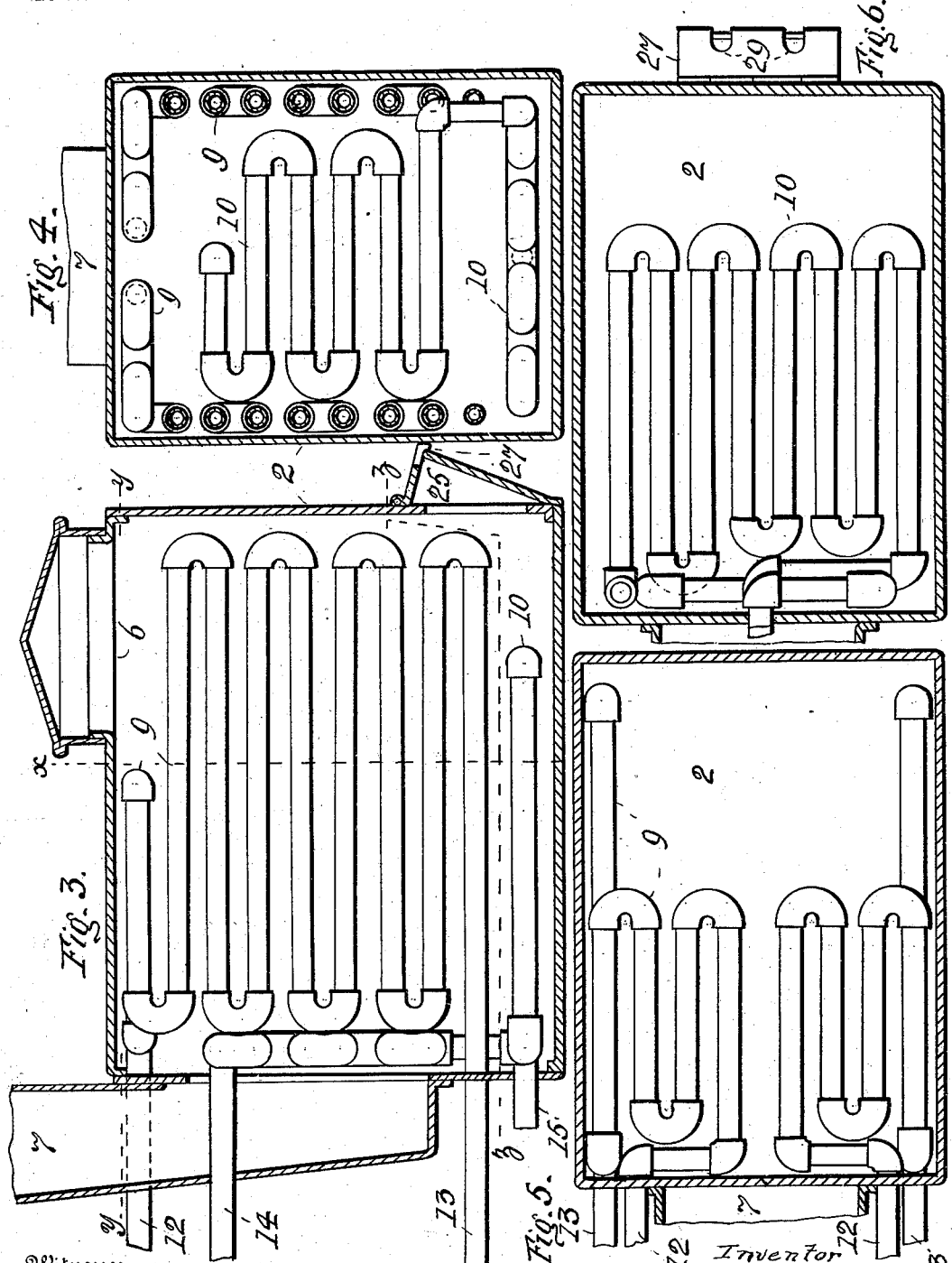

No. 743,234. Patented November 3, 1903.

UNITED STATES PATENT OFFICE.

ROBERT D. BRADLEY, OF LINCHESTER, MARYLAND.

CANNED-GOODS-PROCESSING APPARATUS.

SPECIFICATION forming part of Letters Patent No. 743,234, dated November 3, 1903.

Application filed April 3, 1903. Serial No. 150,870. (No model.)

*To all whom it may concern:*

Be it known that I, ROBERT D. BRADLEY, of Linchester, in the county of Caroline and State of Maryland, have invented certain Improvements in Canned-Goods-Processing Apparatus, of which the following is a specification.

This invention relates to a complete portable apparatus for processing canned goods, as will hereinafter fully appear.

In the description of the said invention which follows reference is made to accompanying drawings, forming a part hereof, and in which—

Figure 1 is an exterior side view of the processing apparatus, and Fig. 2 a top view or plan of the same. Fig. 3 is a central longitudinal section of the fire-box of the apparatus on an enlarged scale. Fig. 4 is a section of Fig. 3, taken on the dotted line $x\,x$. Fig. 5 is a section of Fig. 3, taken on the dotted line $y\,y$. Fig. 6 is a section of Fig. 3, taken on the irregular dotted line $z\,z$.

Referring now to the drawings, 1 is the platform of the apparatus. Upon this platform is secured the fire-box or furnace 2, the scalding or cleansing kettle 3, and processing-kettle 4. The furnace or fire-box is provided with an opening 6, through which fuel, generally wood, is introduced, and a pipe 7 to carry off the products of combustion. Within the fire-box is a gang 9 of water-pipe, which practically lines its sides and top, and a second gang 10, which lines its rear and bottom.

12 12 are pipes leading from the upper portion of the gang 9 to the processing-kettle 4 to deliver water thereto, and 13 13 return-pipes through which the water from the tank enters the gang 9 near its bottom. If the processing-tank is supplied with water the level of which is above the water-pipes and fire started in the furnace there will be a complete circulation of water, which will retain the water in the processing-kettle at the boiling-point.

14 is a pipe leading from the rear section of the gang 10 to the scalding-kettle 3, and 15 a return-pipe which enters the gang near its base. These pipes, together with the gang 10, produce a circulation of water in the scalding-kettle similar to that in the processing one, and the effect of the whole apparatus thus far described is to retain a uniform temperature throughout the bodies of water in the two kettles.

17 is a swinging crane stepped in the plate upon which the processing and scalding kettles rest and supported by guy-rods 20.

23 is a crate or grating upon which the canned goods to be processed are placed as a preliminary to their introduction into the processing-kettle. It is suspended from the crane by means of a central rod 24 and a rope and pulley-blocks, as shown in Fig. 1.

When a temperature not exceeding that of boiling water is required in the kettles, they are provided with loosely-fitting covers, as shown in the drawings; but should a temperature exceeding that of boiling water be necessary the said covers would have to be secured tightly in place and safety-valves applied to prevent a dangerous tension of steam being attained.

From the foregoing description it will be understood that this apparatus comprises everything essential for the processing of canned goods on a comparatively small scale and is therefore specially adapted for the use of farmers the extent of whose business would not justify the installation of the usual canning plant.

It will be seen that the furnace or fire-box is simply a shell, and the gangs of pipes which effect the circulation of water in the kettles also serve to protect the shell of the fire-box from contact with the burning logs, and the shell is therefore not injured by the firing operation.

It will be seen that the lower section of the gang 10 does not extend to the front of the fire-box. This arrangement admits of the collection of a body of hot cinders, into which soldering-tools are plunged through the pocket 25 to retain them in a heated condition and ready for use in closing the vents in the can-caps. The pocket is furnished with a hinged lid 27, having notches 29 to accommodate the handles or shanks of the soldering-tools.

The operation of the apparatus is as follows: Supposing tomatoes are to be processed, they are first scalded in the kettle 3 to remove their skins, after which they are placed in cans and hermetically sealed. The sealed cans are then placed on the crate and lowered into the processing-kettle and retained in the water therein for a sufficient time, after which the crate is lifted out of the processing-kettle and swung around, as shown in Fig. 2, and the cans removed therefrom. The caps of the cans are then perforated and subsequently closed with solder.

I claim as my invention—

A portable canned-goods-processing apparatus, which consists of the combination of a platform, a fire-box, a scalding-kettle, a processing-kettle, gangs of pipe which practically line the inside of the fire-box, circulating-pipes which unite the gangs of pipe in the fire-box with the kettles and effect a circulation of water therein, and a swinging crane stepped on the said platform, substantially as specified.

ROBERT D. BRADLEY.

Witnesses:
OREGON MILTON DENNIS,
HARRY J. DE BEAR.